(12) United States Patent
Eo et al.

(10) Patent No.: US 12,081,499 B1
(45) Date of Patent: Sep. 3, 2024

(54) CONTEXT-BASED INTERACTIVE SERVICE PROVIDING SYSTEM AND METHOD

(71) Applicant: INSWAVE SYSTEMS CO., LTD., Seoul (KR)

(72) Inventors: Se Yong Eo, Seoul (KR); Woog Lae Kim, Seoul (KR)

(73) Assignee: INSWAVE SYSTEMS CO., LTD., Seoul (KR)

( * ) Notice: Subject to any disclaimer, the term of this patent is extended or adjusted under 35 U.S.C. 154(b) by 0 days.

(21) Appl. No.: 18/589,062

(22) Filed: Feb. 27, 2024

(30) Foreign Application Priority Data

Apr. 10, 2023 (KR) .......................... 10-2023-0046608

(51) Int. Cl.
*H04L 51/02* (2022.01)
*G06F 3/0485* (2022.01)
*H04L 51/04* (2022.01)

(52) U.S. Cl.
CPC .......... *H04L 51/02* (2013.01); *G06F 3/0485* (2013.01); *H04L 51/04* (2013.01)

(58) Field of Classification Search
CPC ........ H04L 51/02; H04L 51/04; G06F 3/0485
See application file for complete search history.

(56) References Cited

U.S. PATENT DOCUMENTS

| | | | |
|---|---|---|---|
| 2014/0112083 A1* | 4/2014 | Schmitt ................... | G11C 7/18 365/189.17 |
| 2018/0174020 A1* | 6/2018 | Wu ........................ | G06N 3/044 |
| 2023/0086778 A1* | 3/2023 | Wang .................... | G06F 3/0488 715/763 |

FOREIGN PATENT DOCUMENTS

| | | |
|---|---|---|
| KR | 20190116041 A | 10/2019 |
| KR | 20200049256 A | 5/2020 |
| KR | 20200119016 A | 10/2020 |
| KR | 20200119019 A | 10/2020 |
| KR | 102256182 B1 | 5/2021 |
| KR | 20210055174 A | 5/2021 |
| KR | 20210134581 A | 11/2021 |

* cited by examiner

*Primary Examiner* — Benjamin M Thieu
(74) *Attorney, Agent, or Firm* — IP & T GROUP LLP

(57) ABSTRACT

Context-based interactive service providing system and method disclosed. Method of providing context-based interactive service, running on a user terminal, includes executing a chatbot by a chatbot execution unit to display a chatting window in accordance with a user input during execution of an application on a user terminal, generating a context information based on a viewport information of the user terminal by a context information generation unit, receiving a chatting message through the chatting window by a message input unit, transmitting the chatting message and the context information as an input message to a chatbot server by a terminal message transmission unit, and receiving an answer message corresponding to the input message from the chatbot server to display as an answer in the chatting window.

7 Claims, 10 Drawing Sheets

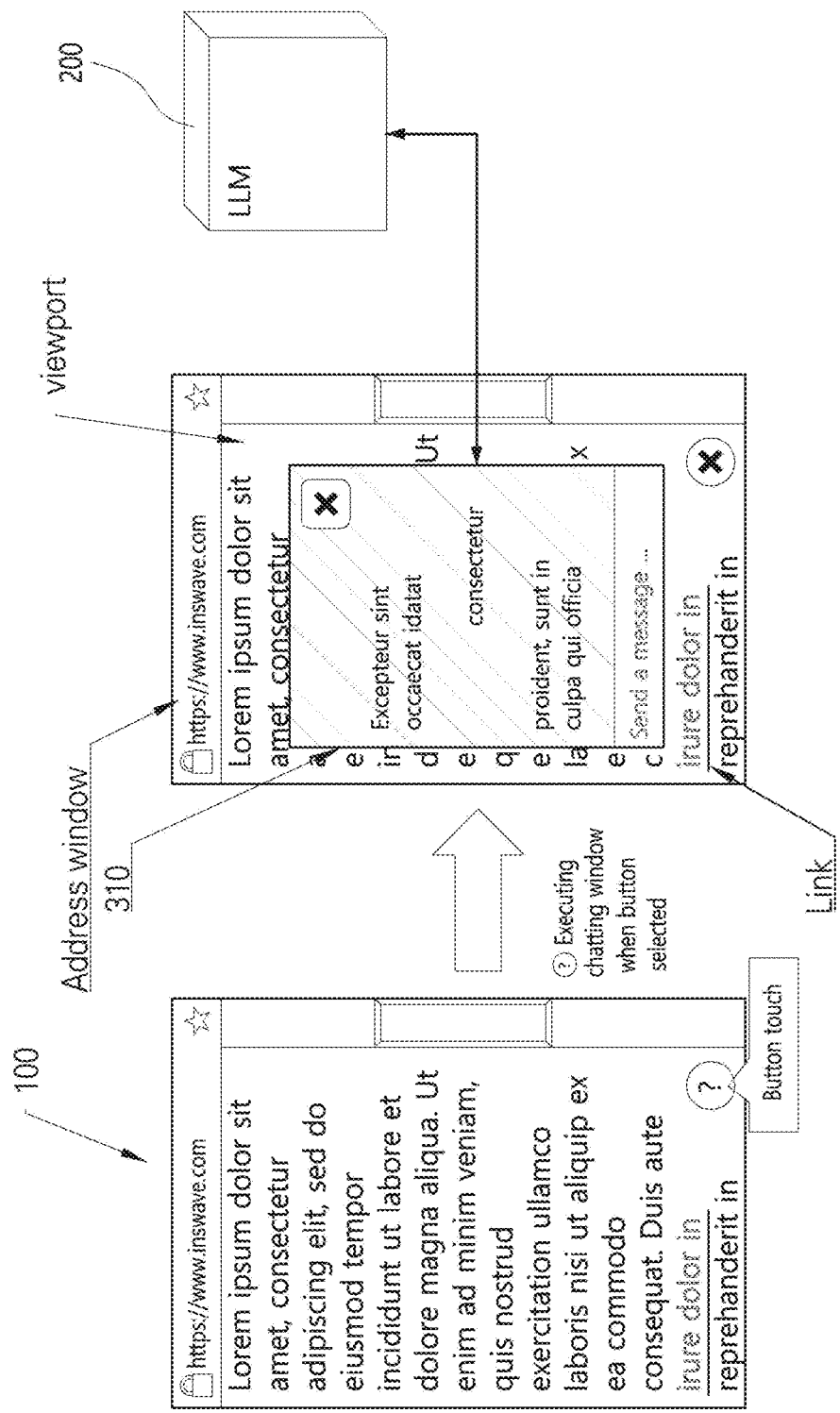

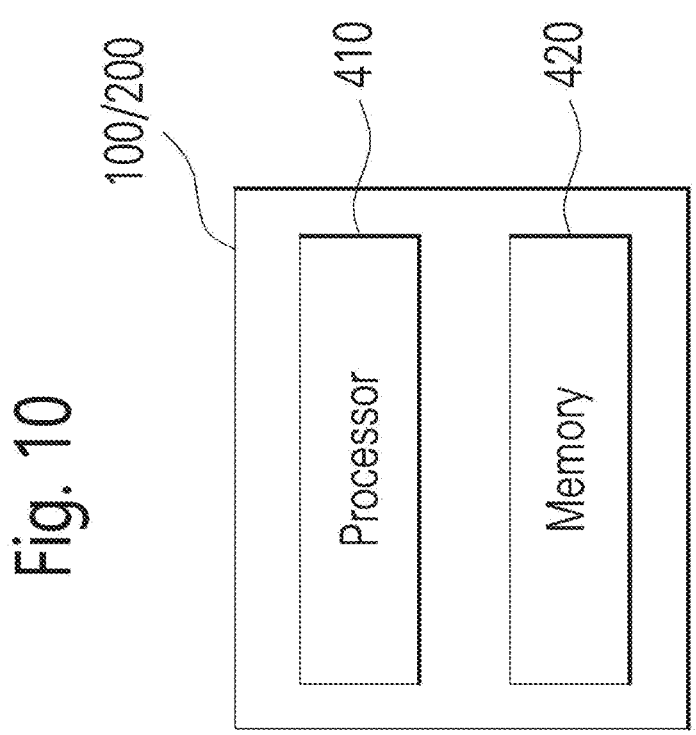

CONTEXT-BASED INTERACTIVE SERVICE PROVIDING SYSTEM AND METHOD

FIELD OF INVENTION

The present invention relates to context-based interactive service providing system and method.

CROSS-REFERENCE TO RELATED APPLICATION

This application claims priority under 35 U.S.C. § 119 to Korean Patent Application No. 10-2023-0046608 filed on Apr. 10, 2023, which is incorporated herein by reference in its entirety.

RELATED ART

Previously, when a user wanted to find a solution in a technical document, the user had to first read and understand the document. And then, the user had to find a solution based on what the user understood.

ChatGPT, a representative general-purpose model of conversational AI(artificial intelligence) technology that has been in the news recently, has excellent natural language processing capability and provides a certain level of answers to user questions. However, it lacks knowledge about a specialized area, for example, how to develop a special-purpose software, so it cannot accurate answers to such question in specialized area.

Additionally, ChatGPT can only process up to 4000 tokens, which limits to adding context.

SUMMARY

The present invention is intended to provide a context-based interactive service providing system and method that can interactively find appropriate answers by automatically using information (text, image, video, etc.) about a screen (viewport) that the user is viewing through a terminal as context.

The present invention is intended to provide a context-based interactive service providing system and method that can improve the answers of interactive artificial intelligence models and handle knowledge from various domain by using information highly relevant to the current screen among technical documents as context in situations where specific domain knowledge is required, such as software development.

Other advantages and objectives will be easily appreciated through description below.

According to one aspect of the present invention, there is provided a method of providing context-based interactive service, running on a user terminal, including executing a chatbot by a chatbot execution unit to display a chatting window in accordance with a user input during execution of an application on a user terminal, generating a context information based on a viewport information of the user terminal by a context information generation unit, receiving a chatting message through the chatting window by a message input unit, transmitting the chatting message and the context information as an input message to a chatbot server by a terminal message transmission unit, and receiving an answer message corresponding to the input message from the chatbot server to display as an answer in the chatting window.

The context data may be generated based on the data being displayed in a viewport.

If there is a scrolling of the viewport prior to the user input, the context information may be generated by additionally using the data that disappeared depending on a scroll direction.

Data in a top area of the viewport may be additionally used if scrolling downwardly and data in a bottom area of the viewport may be additionally used if scrolling upwardly.

A range of data in the top area and the bottom area that is additionally used may be varied based on a scroll speed.

The viewport is a viewer, and at least one of a web address for accessing a document that is displayed in the viewer and a link contained within the document may be additionally used to generate the context information.

The viewport is a video player configured for playing a video content, and at the user input, a current playback position of the video content and a portion of the video content before/after a predermined time based on the current playback position are additionally used to generate the context information.

According to another aspect of the invention, there is provided a user terminal, being connected to a chatbot server through a network to provide a context-based interactive service, including a chatbot execution unit, configured for executing a chatbot to display a chatting window in accordance with a user input during execution of an application, a context information generation unit, configured for generating a context information based on a viewport information of the user terminal, a message input unit, configured for receiving a chatting message through the chatting window; and a terminal message transmission unit, configured for transmitting the chatting message and the context information as an input message to a chatbot server and receiving an answer message corresponding to the input message from the chatbot server to display as an answer in the chatting window.

The application is one of a viewer of displaying a document or an image and a video player of playing a video content, and a button for the user input may be displayed on a screen of the application while running.

The context information generation unit may be configured for generating the context information by using at least one of a data currently displayed in a viewport when the chatting window is running, a data that disappears due to scrolling prior to the user input, a web address for accessing data currently displayed in the viewport and a link contained in the data.

The context information generation unit may additionally use, while the chatting window is running, at least one of a current playback position of a video content being played in the viewport and a portion of the video content before/after a predetermined time based on the current playback position to generate the context information.

Any other aspects, features, and advantages will be more clearly understood from the following detailed description taken in conjunction with the accompanying drawings and claims.

According to embodiments of the present invention, it is advantageous of automatically using information (text, images, videos, etc.) about the viewport that the user is viewing through the terminal as a context to find appropriate answers interactively.

In addition, in situations where specific domain knowledge is required, such as software development, it is possible to improve the answers of an interactive artificial intelligence model and process knowledge from various domains by using information related to the current viewport in a technical document as a context.

BRIEF DESCRIPTION OF ACCOMPANYING DRAWINGS

FIG. 9 illustrates the fifth exemplary diagram of generating context information using am address and link data of a viewport running on a user terminal; and FIG. 10 is a diagram showing a configuration of the user terminal and the chatbot server according to one embodiment of the present invention.

DETAILED DESCRIPTION

Figure 1:
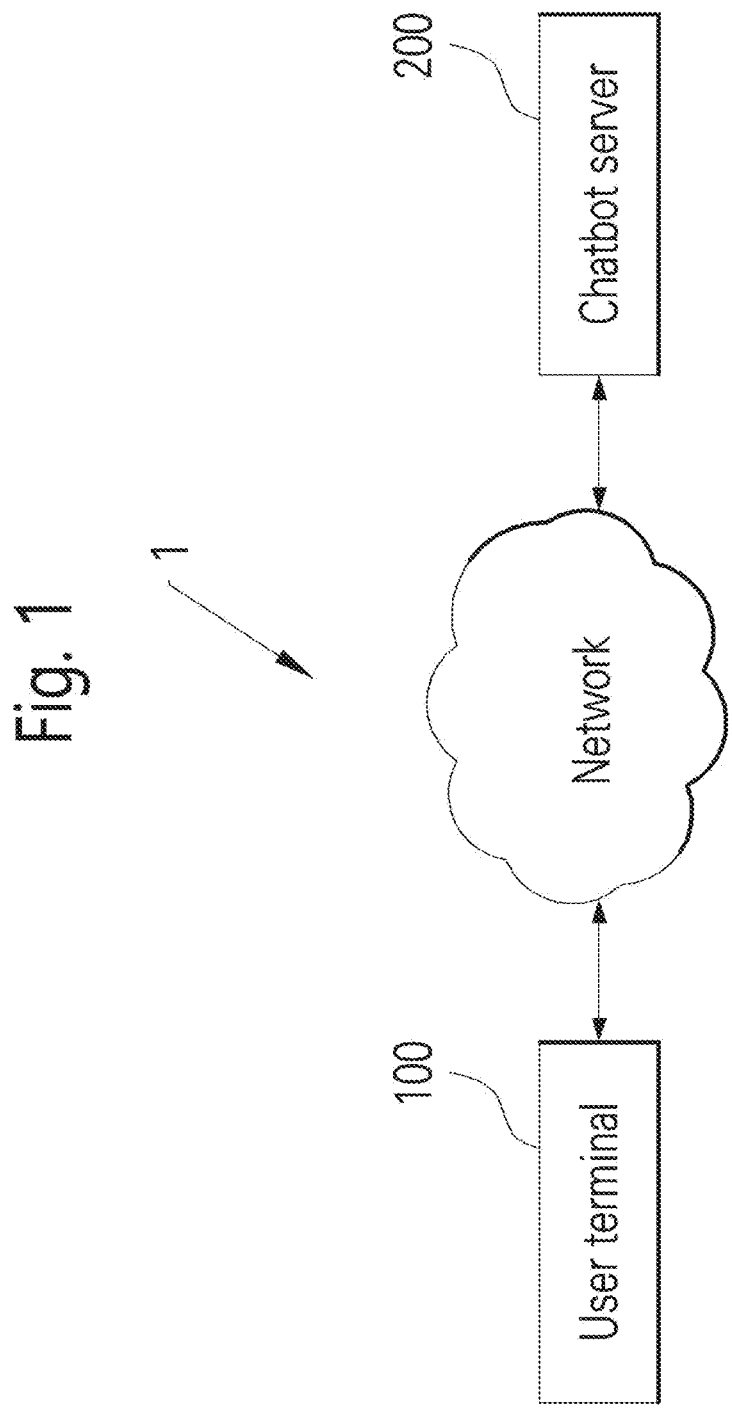
FIG. 1 is a block diagram of a context-based interactive service providing system according to one embodiment of the present invention.

The invention can be modified in various forms and specific embodiments will be described below and illustrated with accompanying drawings. However, the embodiments are not intended to limit the invention, but it should be understood that the invention includes all modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

Terms such as first, second, etc., may be used to refer to various elements, but, these element should not be limited due to these terms. These terms will be used to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

As used herein, a "unit" includes a unit realized by hardware, a unit realized by software, and a unit realized by both. Further, one unit may be implemented using two or more hardware, or two or more units may be implemented using one hardware. In addition, the term "unit" is not meant to be limited to software or hardware, and the "unit" may be configured to reside on an addressable storage medium or may be configured to execute one or more processors. Thus, in one example, "~unit" includes components, such as software components, object-oriented software components, class components, and task components, processes, functions, properties, procedures, subroutines, segments of program code, drivers, firmware, microcode, circuits, data, databases, data structures, tables, arrays, and variables. The functionality provided within the components and "~units" may be combined into fewer components and "~units" or further separated into additional components and "~sub-units". In addition, the components and "~units" may be implemented to recycle one or more CPUs in the device.

In this specification, 'part' includes a unit realized by hardware, a unit realized by software, and a unit realized using both. Additionally, one unit may be realized using two or more pieces of hardware, and two or more units may be realized using one piece of hardware. Meanwhile, '~ part' is not limited to software or hardware, and '~ part' may be configured to reside in an addressable storage medium or may be configured to reproduce one or more processors. Therefore, as an example, '~ part' refers to components such as software components, object-oriented software components, class components, and task components, processes, functions, properties, and procedures; subroutines, segments of program code, drivers, firmware, microcode, circuits, data, databases, data structures, tables, arrays, and variables. The functions provided within the components and 'parts' may be combined into a smaller number of components and 'parts' or may be further separated into additional components and 'parts'. Additionally, components and 'parts' may be implemented to refresh one or more CPUs within the device.

Elements of one embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. If it is determined that detailed description of known techniques involved in the invention makes the gist of the invention obscure, the detailed description thereof will not be made.

Figure 2:
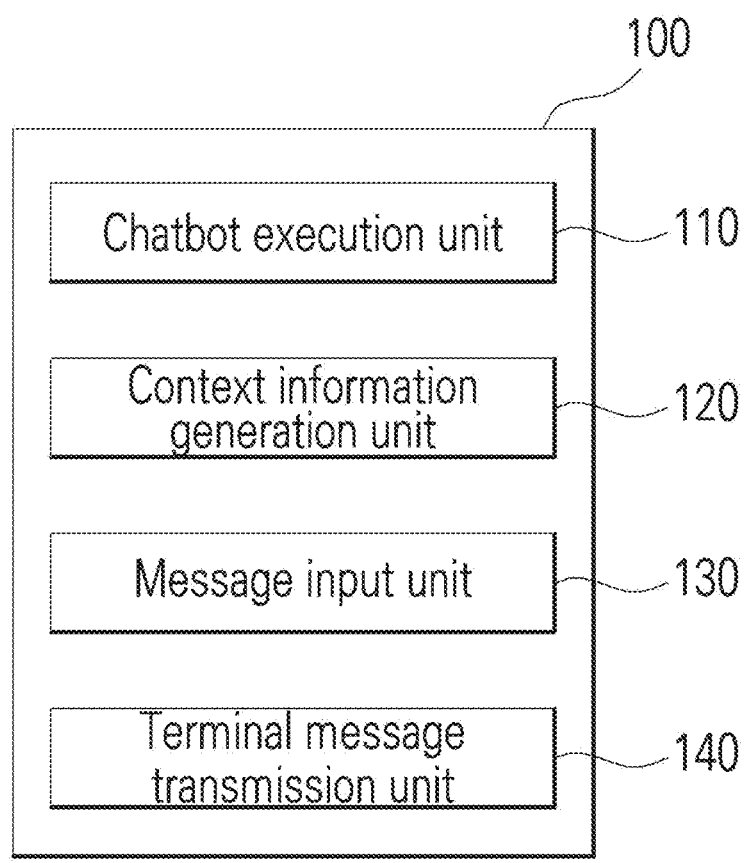
FIG. 2 is a block diagram of a user terminal according to one embodiment of the present invention.
Figure 3:
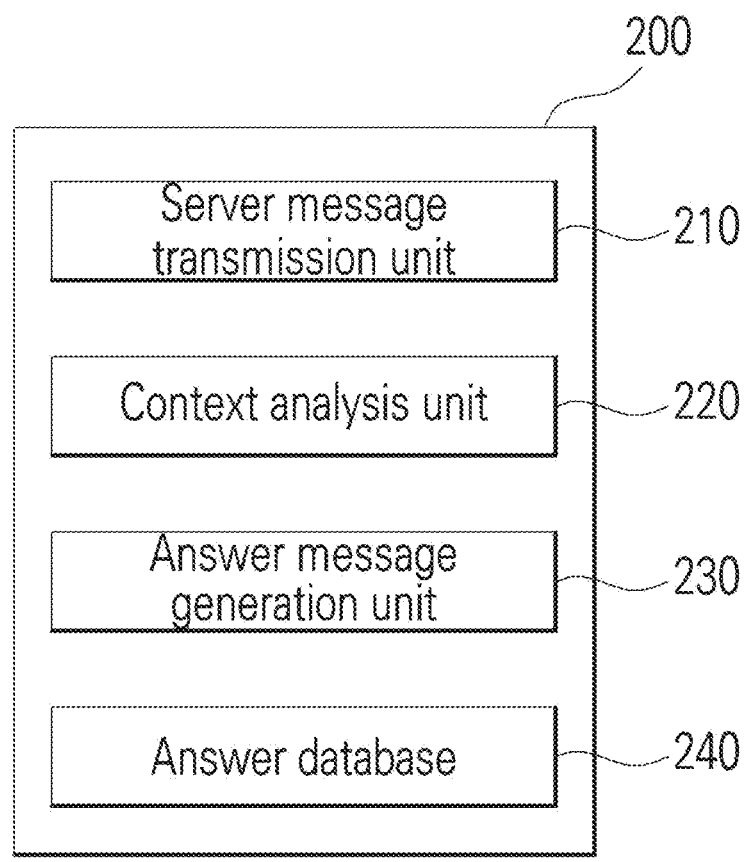
FIG. 3 is a block diagram of a chatbot server according to one embodiment of the present invention.
Figure 4:
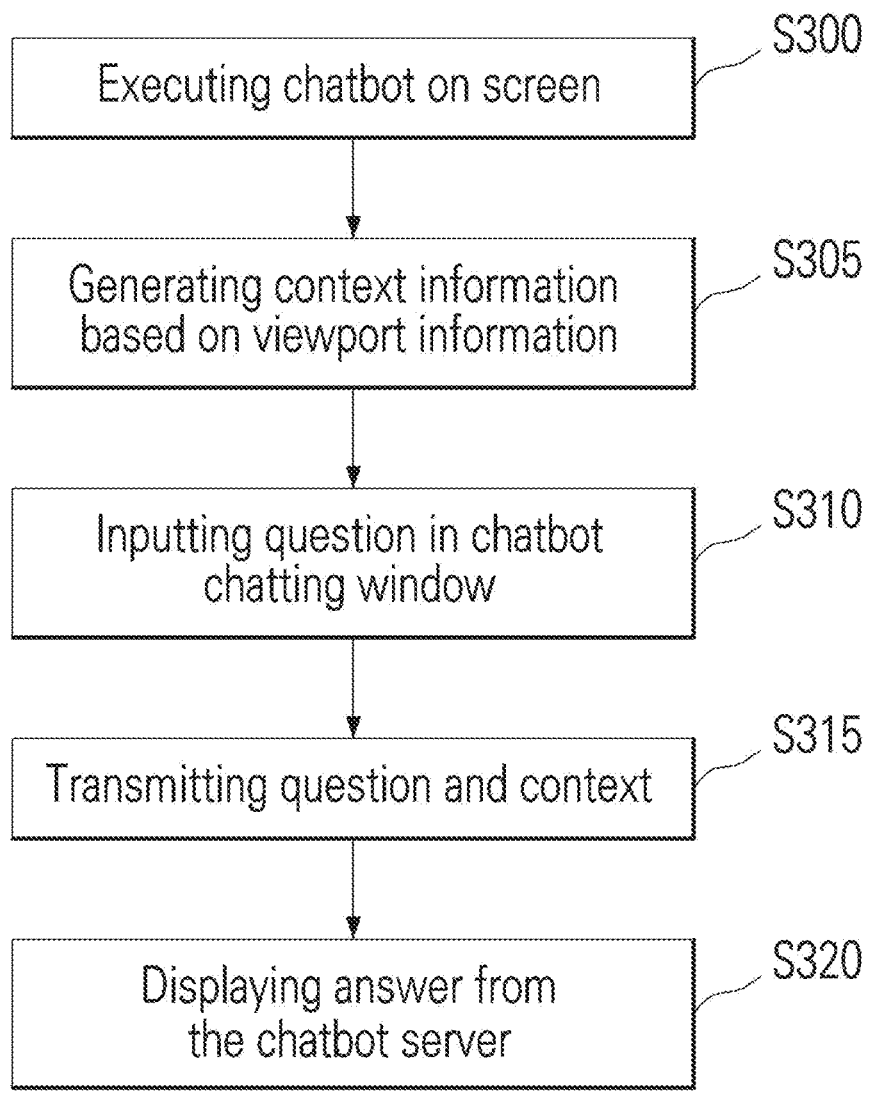
FIG. 4 is a flowchart of a method for providing context-based interactive services according to one embodiment of the present invention.

FIG. 1 is a block diagram of a context-based interactive service providing system according to one embodiment of the present invention, FIG. 2 is a block diagram of a user terminal according to one embodiment of the present invention, FIG. 3 is a block diagram of a chatbot server according to one embodiment of the present invention and FIG. 4 is a flowchart of a method for providing context-based interactive services according to one embodiment of the present invention.

Referring to FIG. 1, the context-based interactive service providing system 1 according to one embodiment may include a user terminal 100 and a chatbot server 200.

The user terminal 100 communicates data with the chatbot server 200 over a network and receives a chatbot service (in one embodiment, a context-based interactive service).

The user terminal 100 is a computing device, such as a smartphone, tablet PC, laptop, desktop PC, etc., that is equipped with a chatbot service-related application or program (hereinafter collectively referred to as 'application') or an operating system that can install via download and run the application.

A chatbot is a computer program designed to perform a specific task through chatting with a human through voice or text. In one embodiment, the chatbot can be implemented executable on a specific application (for example, a document viewer, an image viewer, a video player, etc.) for which interactive services are desired.

Chatbot service refers to a service provided by the chatbot, and may means providing a response to a question message received from the user terminal 100 or performing various requests (e.g., search) received from the user terminal 100.

The chatbot service may be provided in the form of a chatting between the chatbot server 200 and the user terminal 100 through a separate pop-up chat window during the execution of a particular application. In other words, the chatbot service can be provided in such way that a user enters a question or request in the form of a request message in the chat window, and the chatbot server 200 provides an answer to the question or request in the form of an answer message. In this way, the user using the chatbot service can find the information they want or receive the necessary functions as if they were talking to a customer service or a counselor.

Providing the chatbot service through the pop-up chat window is one example, and it will be easily appreciated that the chatbot service can be provided in various other forms.

The chatbot server 200 is a hardware device that installs the chatbot and runs to provide the chatbot service. The service provider may use the chatbot server 200 to provide the chatbot service to the user terminal 100.

In one embodiment, the user terminal 100 may execute the chat window for a chatbot service in response to a user input during execution of a specific application. In this case, context information can be generated using information about the screen displayed through the specific application currently being running, and transmitted to the chatbot server 200 as an input message along with a chatting message input by the user. By analyzing and using context information as well as chatting messages contained in the input message, the chatbot server 200 can find the optimal answer based on the context as an answer message, rather than a simple answer to the question.

Referring to FIG. 2, the user terminal 100 may include a chatbot execution unit 110, a context information generation unit 120, a message input unit 130, and a terminal message transmission unit 140. The components shown in FIG. 2 are not essential for implementing the user terminal 100, so the user terminal 100 described herein may have more or fewer components than those listed above.

The chatbot execution unit 110 may be configured for executing the chatbot (program) when there is a user input specified to receive the chatbot service (step S300). The specified user input may be selecting a specific button (or icon) to execute the chatbot by touching (or clicking).

When the chatbot is executed, the chat window may be displayed in a pop-up manner on the display of the user terminal 100. Just before the chatbot is executed, the user terminal 100 may be executing a particular application, and the display may show a viewport corresponding a screen area of the specific application. In one embodiment, the chat window may be displayed overlapping on the viewport. Alternatively, the display screen can be split to display the chat window in parallel with the viewport or within an area other than that occupied by the viewport.

When the chatbot is running, the context information generation unit 120 may be configured for analyzing the screen area (i.e., viewport) of the specific application currently displayed on the display of the user terminal 100 and generating the context information based on the analysis result (Step S305).

Context information can be generated in the following ways.

Figure 5:
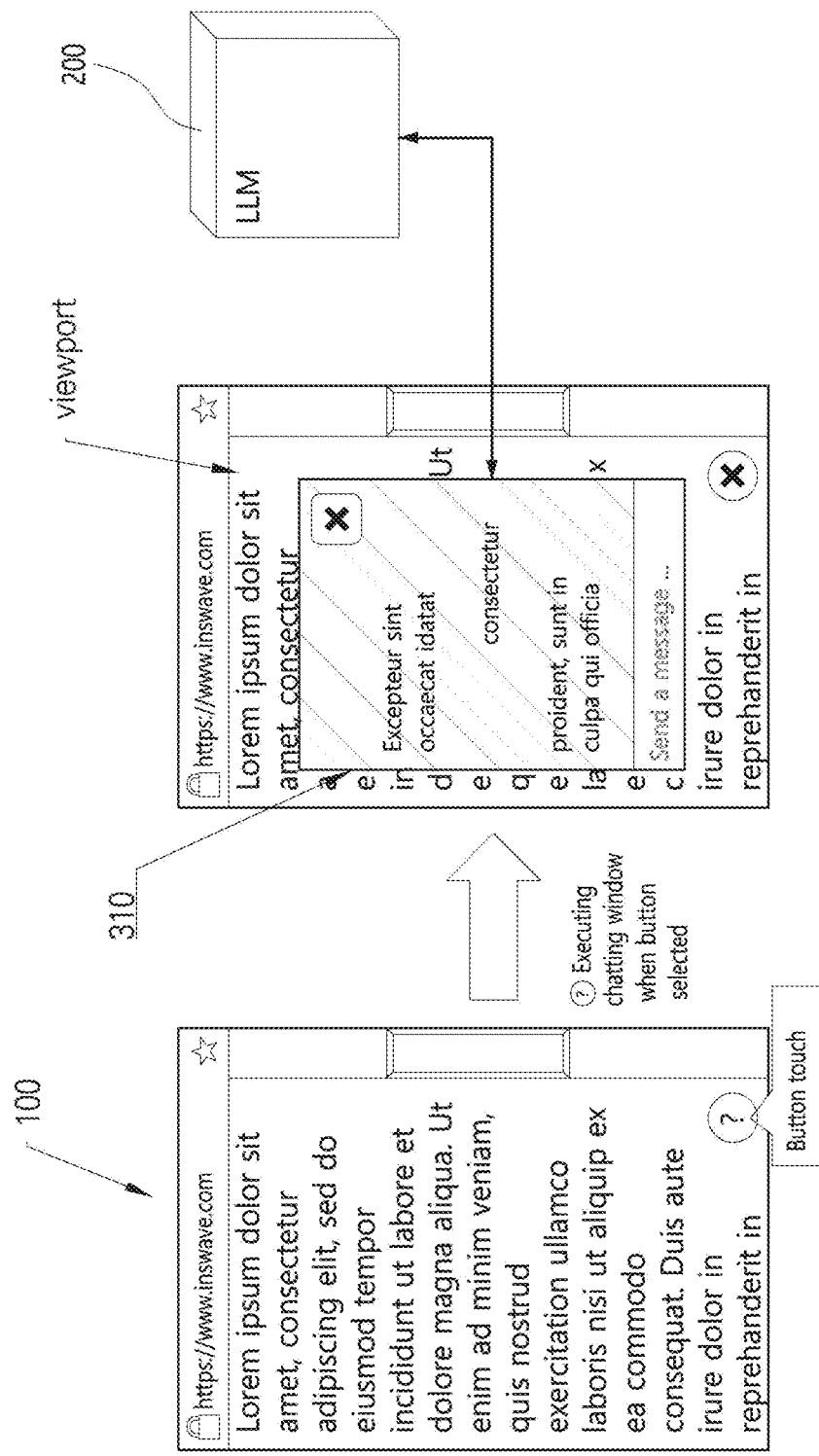
FIG. 5 illustrates the first exemplary diagram of generating context information using the screen of a viewport running on a user terminal.

By default, texts in the viewport are available (see FIG. 5).

Alternatively, texts in the viewport and texts around the viewport (top and/or bottom) may be used.

Figure 6:
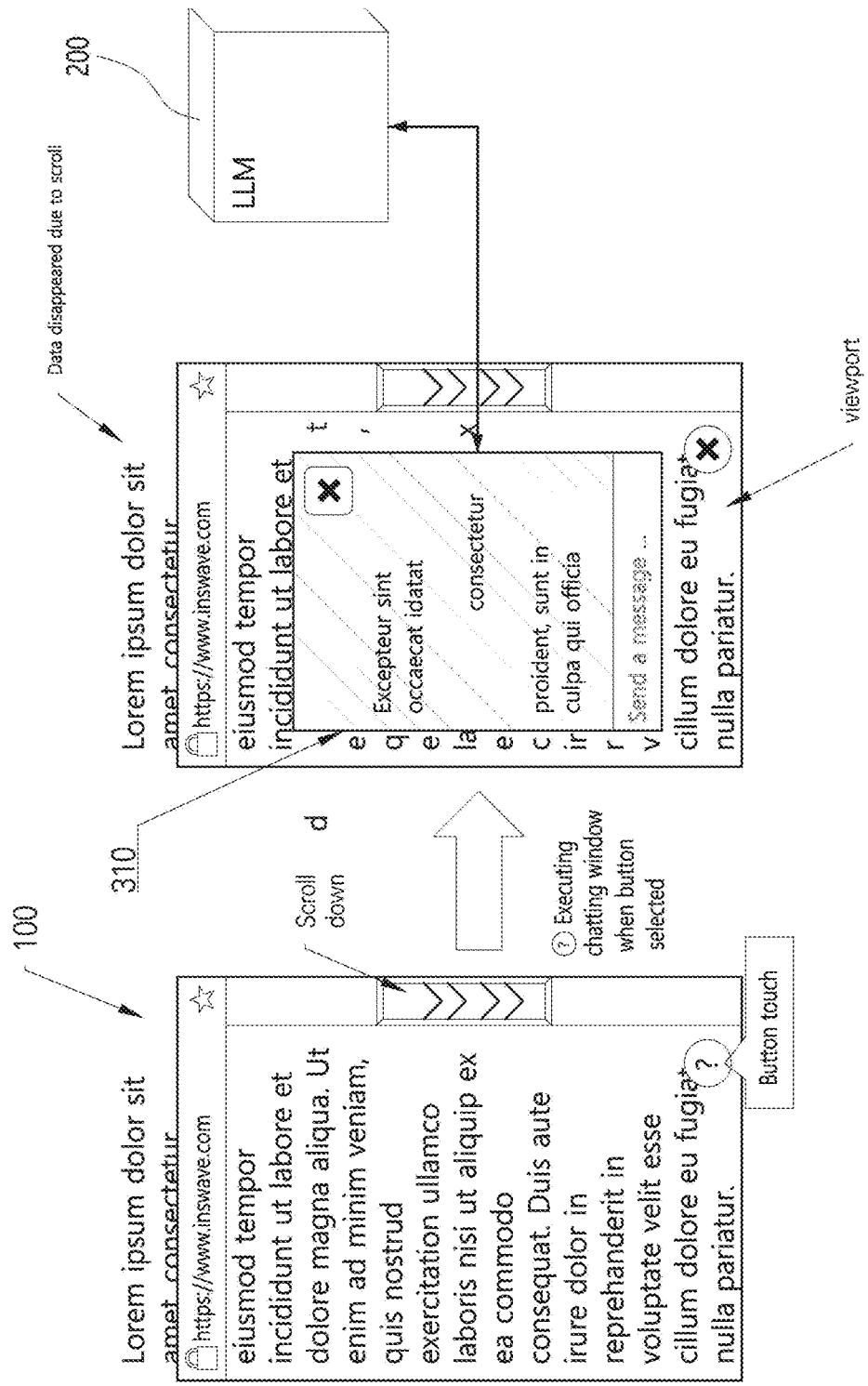
FIG. 6 and FIG. 7 illustrate the second and the third exemplary diagrams of generating context information using a pre-scroll screen of a viewport running on the user terminal.

Alternatively, if scrolling downwardly the screen in the viewport, texts in the top area that disappeared a moment ago from the viewport may be used (see FIG. 6).

Figure 7:
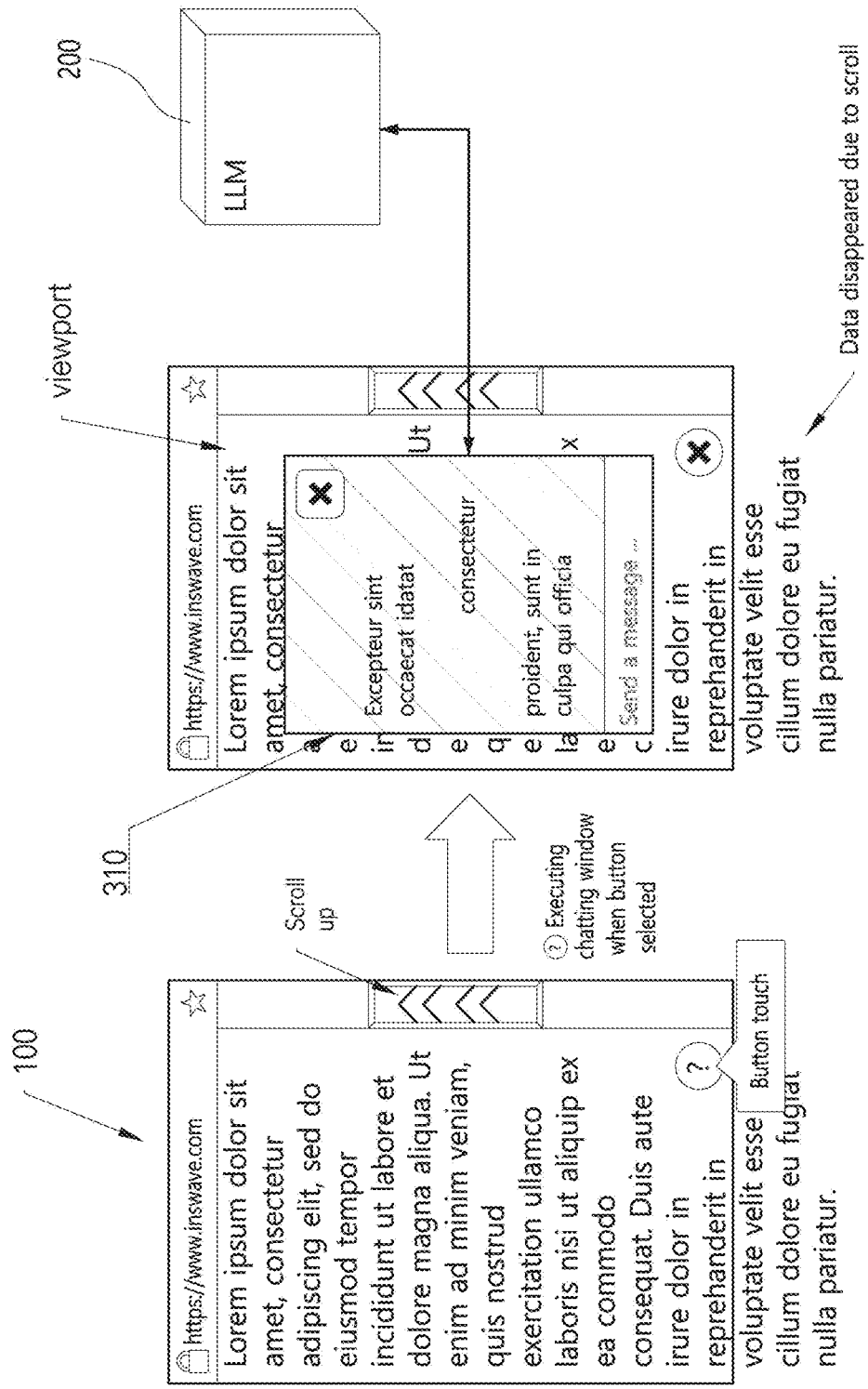

Alternatively, if scrolling upwardly the screen in the viewport, texts in the bottom area that disappeared a moment ago from the viewport may be used (see FIG. 7).

Figure 8:
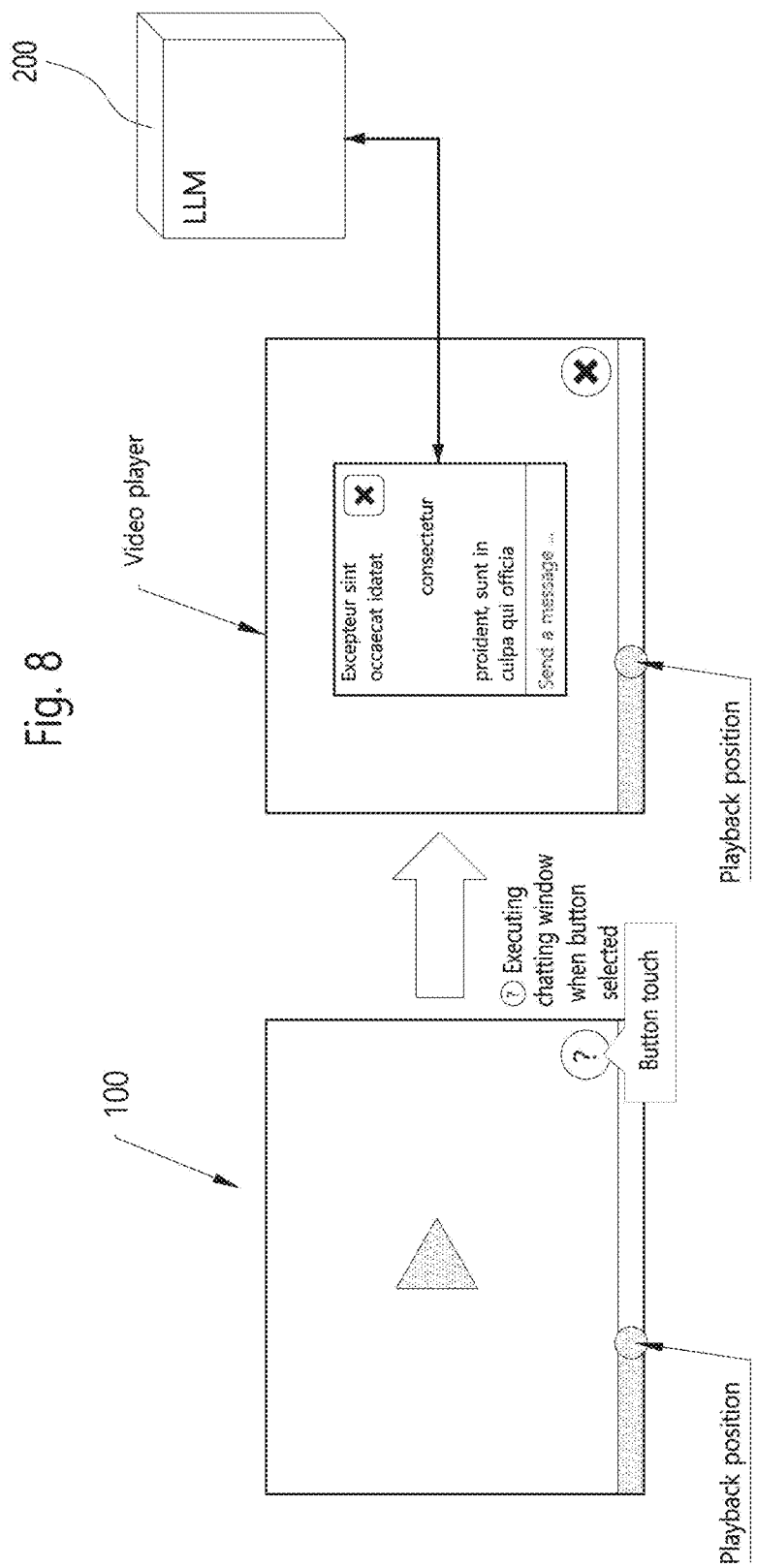
FIG. 8 illustrates the fourth exemplary diagram of generating context information using a video player running on a user terminal.

Alternatively, in the case of video content, the current playback position and previous and/or subsequent content around it may be used (see FIG. 8).

Alternatively, the webpage address of the screen displayed in the viewport and the link included in the screen may be used (see FIG. 9).

The message input unit 130 may be configured for receiving the chatting message from the user (step S310). The ways in which the chatting message is input is not limited. For example, it may include the user's voice expression input through the microphone of the user terminal 100 and the user's text expression input through the typing means (keyboard, keypad, touch screen, mouse, etc.) of the user terminal 100, etc.

The terminal message transmission unit 140 may be configured for transmitting the input message that is generated by combining the chatting message input by the user and the context information to the chatbot server 200 (step S315).

Additionally, the terminal message transmission unit 140 may be configured for receiving the answer message from the chatbot server 200 in response to the input message and displaying it in the chat window so that the user can check it (step S320).

Referring to FIG. 3, the chatbot server 200 may include a server message transmission unit 210, a context analysis unit 220, an answer message generation unit 230, and an answer database 240. The components shown in FIG. 3 are not essential for implementing the chatbot server 200, so the chatbot server 200 described herein may have more or fewer components than those listed above.

The server message transmission unit 210 may be configured for receiving the input message from the user terminal 100 on which the chatbot is executing through the network. Additionally, the server message transmission unit 210 may be configured for transmitting the answer message containing an answer to the input message in response to the input message.

The context analysis unit 220 may be configured for analyzing analyze the input messages to identify conversational messages and context information, respectively. By analyzing the context information extracted from the input message, it is possible to clearly understand what the chatting message means.

The answer message generation unit 230 may be configured for searching the answer database 240 for the answer corresponding to the chatting message and generating the answer message. In this case, the user's intention of the chatting message can be identified based on the context information analyzed by the context analysis unit 220, and the most suitable answer that best meets the user intention can be found.

In the answer database 240, a plurality of expected messages expected to be chatting messages and replies to each expected message may be stored and managed in correspondence with each other. The answer database 240 may be implemented, for example, as a Large Language Model (LLM), an artificial intelligence model that is trained based on a large number of texts.

The answer database 240 may be built within the chatbot server 200 or may be built separately outside and connected through the network.

Since it will be easily appreciated by those skilled in the art that the chatbot server 200 finds and responds to the appropriate answer message using context information and chatting messages, a detailed description will be omitted.

FIG. 5 illustrates the first exemplary diagram of generating context information using the screen of a viewport running on a user terminal.

Referring to FIG. 5, a viewport of a specific application running on the user terminal is shown. Here, the specific application may be a document viewer.

When the user selects (e.g., touches) a specific button within the viewport, a chatbot chatting window 310 may pop up.

When the chatbot chatting window 310 is running, the data displayed in the viewport of the specific application may be used as context information and may be transmitted to the chatbot server 200 along with the user's chatting message, so that the chatbot server 200 may use as a basic data for generating replay for the chatting message.

Context information can be generated by assigning a predetermined weight to some texts displayed in the viewport when the chatbot chatting window 310 is running among the entire texts of the document displayed through the document viewer.

FIG. 6 and FIG. 7 illustrate the second and the third exemplary diagrams of generating context information using a pre-scroll screen of a viewport running on the user terminal.

Referring to FIG. 6, a viewport of a specific application running on the user terminal is shown. Here, the specific application may be a document viewer.

This exemplary diagram is about the user scrolling downwardly just before touching a button.

When the user selects (e.g., touches) a specific button within the viewport, a chatbot chatting window 310 may pop up.

When the chatbot chatting window 310 is running, the data currently displayed in the viewport of the specific application and the data at the top of the viewport that disappears from the current viewport by scrolling downwardly may be combined and used as context information, and be sent to the chatbot server 200 along with the user's chatting message, the chatbot server 200 may use as a basic data for generating answer for the chatting message.

Among the entire texts of the document displayed through the document viewer, context information can be generated by assigning a predetermined weight to some texts displayed in the viewport and texts surrounding (particularly, the top) of the viewport when the chatbot chatting window 310 is running.

FIG. 7 illustrates a case where a scroll direction is upward instead of downward direction. In this case, the data currently displayed in the viewport and the data at the bottom of the viewport that disappears from the current viewport by scrolling upwardly can be combined and used as context information.

In other words, the range of data that disappears due to scrolling but will be used as context information may vary depending on the scroll direction.

Additionally, the range of data that disappears due to scrolling but will be used as context information may vary depending on a scroll speed. If the scroll speed is fast, the range of the top and/or bottom of the viewport to be used as context information may increase, and if the scrolling speed is slow, the range of the top and/or bottom of the viewport to be used as context information may decrease. In other words, the range of the top and/or bottom of the viewport to be used as context information may be determined in proportion to the scroll speed.

FIG. 8 illustrates the fourth exemplary diagram of generating context information using a video player running on a user terminal.

Referring to FIG. 8, a specific application running on the user terminal may be a video player.

When the user selects (e.g., touches) a specific button in the viewport while the video player is playing, the chatbot chatting window 310 may pop up.

When the chatbot chatting window 310 is running, a current playback position of the video content played by the video player and a portion of the video content before/after a predetermined time based on the current playback position can be used as context information.

FIG. 9 illustrates the fifth exemplary diagram of generating context information using am address and link data of a viewport running on a user terminal Referring to FIG. 9, a viewport of a specific application running on the user terminal is shown. Here, the specific application may be a document viewer.

This exemplary diagrams is about a case where a web address for a document displayed in the viewport exists or a link exists within the document.

When the user selects (e.g., touches) a specific button within the viewport, a chatbot chatting window 310 may pop up.

When the chatbot chatting window 310 is executed, any combination of the data (text and/or image) currently displayed in the viewport of the specific application, the web address for accessing the document, and the link contained within the document may be used as context information, and be sent to the chatbot server 200 along with the user's chatting message, the chatbot server 200 may use as a basic data for generating answer for the chatting message.

According to one embodiment, by executing a chatbot chatting window and entering a question while viewing content (e.g., a document) related to specific domain knowledge, the user is provided with an answer using a portion of the content as an extended context, thereby increasing the accuracy of answers to questions while providing an ability to process knowledge in various domains. This may shorten the process of reading and understanding existing documents and provide users with faster and more accurate information.

FIG. 10 is a diagram showing a configuration of the user terminal 100 and the chatbot server 200 according to one embodiment of the present invention.

Referring to FIG. 10, the user terminal 100 and/or chatbot server 200 may include a processor 410 and a memory 420.

Memory 420 is configured for storing one or more instructions executable by processor 410. Processor 410 is configured for executing one or more instructions stored in memory 420. Processor 410 may perform one or more operations described above with respect to FIGS. 1-9 by executing instructions. Additionally, the configuration of the present invention described above with reference to FIGS. 2 and 3 may be implemented by instructions executed by the processor 410.

The aforementioned method of providing context-based interactive service may also be implemented in the form of a recording medium including computer-executable instructions, such as an application or program module executed by a computer. The computer-readable medium can be any available medium that can be accessed by a computer, and includes both volatile and non-volatile media, and removable and non-removable media. Further, the computer-readable medium may include a computer storage medium. The computer storage medium includes both volatile and non-volatile, removable and non-removable media implemented with any method or technology for storing information such as computer-readable instructions, data structures, program modules, or other data.

The aforementioned method of providing context-based interactive service may be executed by an application installed by default on the terminal (which may include programs included in platforms or operating systems that are basically installed in the terminal), or it may be executed by an application (i.e., a program) installed by the user directly on the master terminal through an application delivery server, such as an application store server, an application or a web server associated with such a service. In this sense, the aforementioned method of providing context-based interactive service may be implemented by an application (i.e., a program) installed by default on the terminal or installed directly by the user, and recorded on a computer-readable recording medium such as the terminal.

While the invention has been described above with reference to exemplary embodiments, it will be understood by those skilled in the art that the invention can be modified and changed in various forms without departing from the concept and scope of the invention described in the appended claims.

What is claimed is:

1. A method of providing context-based interactive service, running on a user terminal, comprising:
   executing a chatbot by a chatbot execution unit to display a chatting window in accordance with a user input during execution of an application on a user terminal;
   generating a context information based on a viewport information of the user terminal by a context information generation unit;
   receiving a chatting message through the chatting window by a message input unit;
   transmitting the chatting message and the context information as an input message to a chatbot server by a terminal message transmission unit; and
   receiving an answer message corresponding to the input message from the chatbot server to display as an answer in the chatting window,
   wherein the context data is generated based on a data being displayed in a viewport, and
   wherein if there is a scrolling of the viewport prior to the user input, the context information is generated by additionally using the data that disappeared depending on a scroll direction.

2. The method of providing context-based interactive service of claim 1, wherein data in a top area of the viewport is additionally used if scrolling downwardly and data in a bottom area of the viewport is additionally used if scrolling upwardly.

3. The method of providing context-based interactive service of claim 2, wherein a range of data in the top area and the bottom area that is additionally used is varied based on a scroll speed.

4. The method of providing context-based interactive service of claim 1, wherein the viewport is a viewer, and
   wherein at least one of a web address for accessing a document that is displayed in the viewer and a link contained within the document is additionally used to generate the context information.

5. A method of providing context-based interactive service, running on a user terminal, comprising:
   executing a chatbot by a chatbot execution unit to display a chatting window in accordance with a user input during execution of an application on a user terminal;
   generating a context information based on a viewport information of the user terminal by a context information generation unit;
   receiving a chatting message through the chatting window by a message input unit;
   transmitting the chatting message and the context information as an input message to a chatbot server by a terminal message transmission unit; and
   receiving an answer message corresponding to the input message from the chatbot server to display as an answer in the chatting window,
   wherein the viewport is a video player configured for playing a video content, and
   wherein at the user input, a content of a current playback position of the video content is used and a portion of contents before/after a predetermined time based on the current playback position are additionally used to generate the context information.

6. A user terminal, being connected to a chatbot server through a network to provide a context-based interactive service, comprising:
   a chatbot execution unit, configured for executing a chatbot to display a chatting window in accordance with a user input during execution of an application;
   a context information generation unit, configured for generating a context information based on a viewport information of the user terminal;
   a message input unit, configured for receiving a chatting message through the chatting window; and
   a terminal message transmission unit, configured for transmitting the chatting message and the context information as an input message to a chatbot server and receiving an answer message corresponding to the input message from the chatbot server to display as an answer in the chatting window,
   wherein the application is a viewer of displaying a document or an image, wherein a button for the user input is displayed on a screen of the application while running, and
   wherein the context information generation unit is configured for generating the context information by using a data currently displayed in a viewport when the chatting window is running and a data that disappears due to scrolling prior to the user input.

7. A user terminal, being connected to a chatbot server through a network to provide a context-based interactive service, comprising:

a chatbot execution unit, configured for executing a chatbot to display a chatting window in accordance with a user input during execution of an application;

a context information generation unit, configured for generating a context information based on a viewport information of the user terminal;

a message input unit, configured for receiving a chatting message through the chatting window; and a terminal message transmission unit, configured for transmitting the chatting message and the context information as an input message to a chatbot server and receiving an answer message corresponding to the input message from the chatbot server to display as an answer in the chatting window, wherein the application is a video player of playing a video content, wherein a button for the user input is displayed on a screen of the application while running, and wherein the context information generation unit uses, while the chatting window is running, a content of a current playback position of the video content being played in the viewport, and additionally uses a portion of contents before/after a predetermined time based on the current playback position to generate the context information.

* * * * *